(12) United States Patent
Stergiou et al.

(10) Patent No.: US 8,688,902 B2
(45) Date of Patent: Apr. 1, 2014

(54) METHOD AND SYSTEM FOR PROCESSING ACCESS CONTROL LISTS USING AN EXCLUSIVE-OR SUM-OF-PRODUCTS EVALUATOR

(75) Inventors: Stergios Stergiou, Palo Alto, CA (US); Jawahar Jain, Los Altos, CA (US)

(73) Assignee: Fujitsu Limited, Kawasaki-shi (JP)

( * ) Notice: Subject to any disclaimer, the term of this patent is extended or adjusted under 35 U.S.C. 154(b) by 1273 days.

(21) Appl. No.: 12/462,700

(22) Filed: Aug. 6, 2009

(65) Prior Publication Data

US 2010/0037016 A1 Feb. 11, 2010

Related U.S. Application Data

(60) Provisional application No. 61/086,680, filed on Aug. 6, 2008.

(51) Int. Cl.
*G06F 12/02* (2006.01)
(52) U.S. Cl.
USPC .................................. 711/108; 711/E12.069
(58) Field of Classification Search
USPC .......................................... 711/108; 709/246
See application file for complete search history.

(56) References Cited

U.S. PATENT DOCUMENTS

| | | | | |
|---|---|---|---|---|
| 7,430,560 | B1* | 9/2008 | Mittal | 1/1 |
| 7,757,152 | B2* | 7/2010 | Wickeraad et al. | 714/763 |
| 7,836,490 | B2* | 11/2010 | Smith | 726/4 |
| 2001/0025321 | A1* | 9/2001 | Tang et al. | 709/246 |
| 2009/0097495 | A1* | 4/2009 | Palacharla et al. | 370/413 |

* cited by examiner

*Primary Examiner* — Reginald Bragdon
*Assistant Examiner* — Hamdy S Ahmed
(74) *Attorney, Agent, or Firm* — Baker Botts L.L.P.

(57) ABSTRACT

A method includes receiving input data comprising a plurality of bits and processing an access control list into an ESOP expression comprising a plurality of product terms. The method also includes storing a plurality of bits associated with the plurality of product terms in a TCAM comprising a plurality of rows and comparing the plurality of bits associated with the input data to the plurality of bits associated with the product terms stored in each row of the plurality of rows, such that each row of the TCAM outputs a plurality of signals, such that each of the plurality of signals indicate a match or no match for each bit stored in the selected row. The method includes receiving the plurality of signals from the plurality of rows by an ESOP evaluator and outputting an address associated with a selected row from the plurality of rows of the TCAM.

17 Claims, 5 Drawing Sheets

METHOD AND SYSTEM FOR PROCESSING ACCESS CONTROL LISTS USING AN EXCLUSIVE-OR SUM-OF-PRODUCTS EVALUATOR

RELATED APPLICATION

This application claims priority under 35 U.S.C. §119(e) to U.S. Provisional Application Ser. No. 61/086,680 filed Aug. 6, 2008, which is hereby incorporated by reference in its entirety.

TECHNICAL FIELD

The present disclosure relates generally to access control lists, and more particularly to processing access control lists using an exclusive- or sum-of-products evaluator.

BACKGROUND

One of the largest problems facing the Internet infrastructure comes from the enormous growth of the Internet routing tables. For example, a router may have more than 200,000 routes stored in its routing table. In order to implement packet forwarding and filtering, a router is required to perform lookup operations on its access control list based on the source and destination IP address from incoming IP packets. Thus, the ability to efficiently implement packet forwarding and filtering presents a significant challenge to system designers and network operators.

SUMMARY

In accordance with the teachings of the present disclosure, a system and method for processing access control lists using an exclusive- or sum-of-products evaluator are provided. In a particular embodiment, a method for processing access control lists using an exclusive- or sum-of-products evaluator comprises receiving input data comprising a plurality of bits and processing an access control list into an exclusive- or sum-of-products (ESOP) expression comprising a plurality of product terms. The method also includes storing a plurality of bits associated with the plurality of product terms in a ternary content addressable memory (TCAM) comprising a plurality of rows. The method includes comparing the plurality of bits associated with the input data to the plurality of bits associated with the product terms stored in each row of the plurality of rows, such that each row of the TCAM outputs a plurality of signals, such that each of the plurality of signals indicates a match or no match for each bit stored in the selected row. The method also includes receiving the plurality of signals from the plurality of rows by an ESOP evaluator and outputting an address associated with a selected row from the plurality of rows of the TCAM, the selected row storing a plurality of bits that match the plurality of bits associated with the input data. In one embodiment, the selected row storing a plurality of bits may match a subset of the plurality of bits associated with the input data.

Certain embodiments of the invention may provide one or more technical advantages. For example, ESOP expressions and evaluators require fewer product terms to build functions associated with the access control lists than sum-of-product (SOP) evaluators. Thus, certain systems and methods using ESOP evaluators may result in a reduced size of an expression representing the access control lists. Thus, less memory may be required to store an ESOP expression based on the access control lists. As a result, the TCAM may be built with smaller dimensions using a smaller circuit, which may be more cost effective because the circuits may require less power and less hardware (e.g., fewer gates and fewer memory cells). Additionally, a smaller circuit may also result in higher speeds. Alternatively, an access control list may store more rules in a TCAM using ESOP expressions and evaluators as opposed to using SOP expressions and evaluators, since the rules may require fewer product terms when represented as ESOP expressions.

Other technical advantages of the disclosed system may be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

For a more complete understanding of the present disclosure and features and advantages thereof, reference is now made to the following description, taken in conjunction with the accompanying drawings, in which.

DETAILED DESCRIPTION

Figure 1:
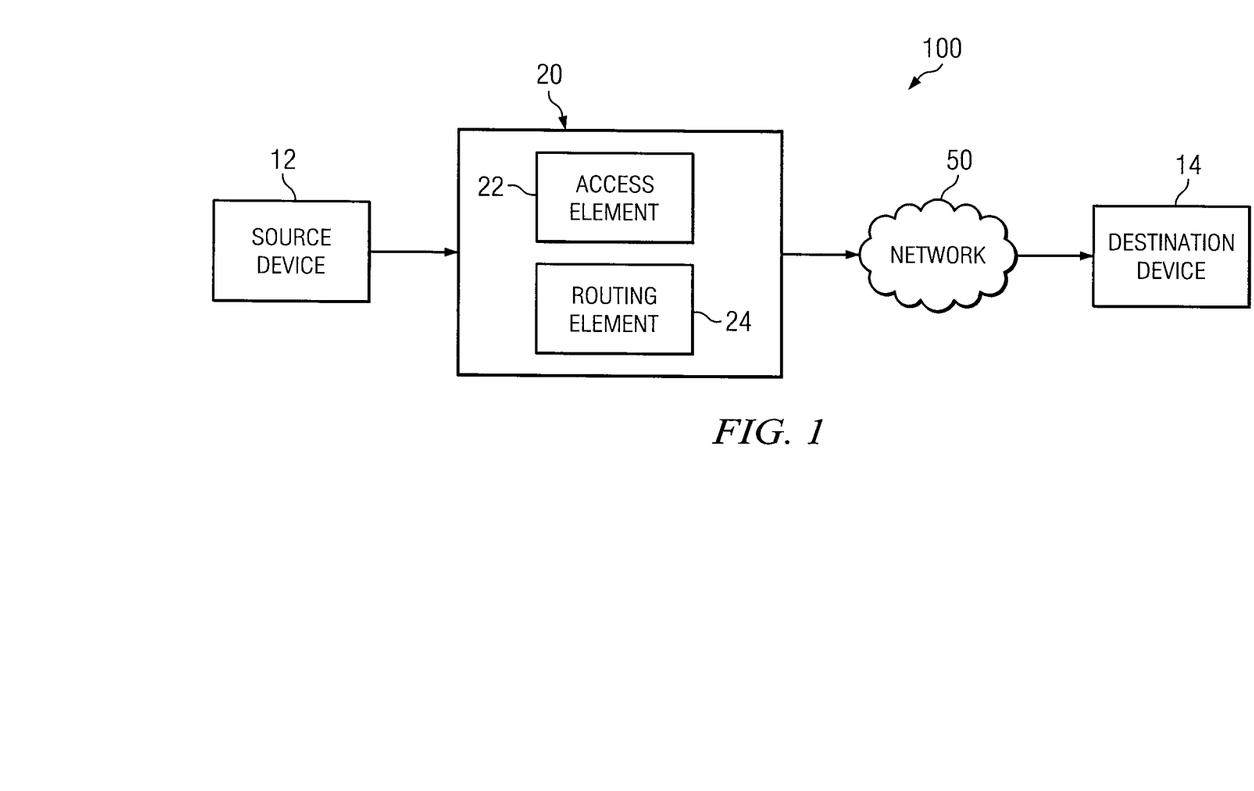
FIG. 1 is a block diagram illustrating a system for determining if data from a source device has permission to be routed to a destination device in accordance with a particular embodiment of the present disclosure.

FIG. 1 is a block diagram illustrating a system 100 for determining if data from a source device 12 has permission to be routed to a destination device 14 in accordance with a particular embodiment. System 100 may include a network 20 coupled to a source device 12, a destination device 14, and a processing device 20. As illustrated, processing device 20 may also include an access element 22 for determining if data from source device 12 has permission to be routed to destination device 14 and a routing element 24 for routing the data from source device 12 to destination device 14, if the data has permission to be routed to destination device 14. As referred to throughout this document, ESOP stands for an exclusive- or sum-of-products, SOP stands for a sum-of-products, CAM stands for content addressable memory, and TCAM stands for ternary content addressable memory.

Source device 12 may be operable to send data to destination device 14. Source device 12 and destination device 14 may generally be any processor-controlled device or combination of two or more such devices capable of executing a computing operation. For example, source device and/or destination device may include a computer, a personal digital assistant (PDA), a laptop or an electronic notebook, a telephone, a mobile station, or any other device, component, element, or object capable of initiating data exchanges within system 100. In one embodiment, the data sent by source device 12 may be sent in one or more Internet Protocol (IP) packets. An IP packet may include the IP address of source device 12 and the IP address of destination device 14.

Processing device 20 may be operable to receive data from source device 12, determine if the data has permission to be routed to destination device 14, and route the data to destination device 14. For example, processing device 20 may be a router or a server. Processing device 20 may generally be any processor-controlled device or combination of two or more such devices capable of executing a computing operation. Processing device 20 may execute applications, logic, and/or algorithms. Such applications may include software or other logic embodied in a computer-readable medium.

Each processing device 20 may include one or more suitable input devices, output devices, mass storage media, processors, memory, interfaces, communication ports, or other appropriate components and/or software for receiving, processing, storing, and communicating information according to the operation of system 10.

Processing device 20 may include access element 22 to determine if data from source device 12 has permission to be routed to destination device 14. An access control list may include a list of rules that determine whether or not the data has permission to be forwarded from source device 12 to destination device 14. If the data is not permitted to be forwarded, it may be dropped.

For a small-scale processing device 20 where requirements on bandwidth are not critical, access element 22 may be implemented using software. For a large-scale processing device 20 where requirements on bandwidth may be critical may be implemented using a hardware solution. The requirements on bandwidth may be critical because processing device 20 may be required to concurrently process data from multiple interfaces, which may have multi-gigabit physical links. Typically, software solutions do not scale at such large speeds.

In one embodiment, access element 22 may be implemented with a hardware solution using content addressable memories (CAMs). CAMs are a special purpose memory structure that enable single clock cycle lookups on unsorted data. Unlike a RAM, which returns the data word stored at a given address, a CAM returns the smallest address where a matching data word is found. CAMs can speed up the address lookup time by access element 22. Access element 22 is described in more detail in FIGS. 2A, 2B, and 2C for particular embodiments.

Processing device 20 may include routing element 24 to route the data from source device 12 to destination device 14 if access element 22 determines that the data is permitted to be routed to device 14. Routing element 24 may use the Border Gateway Protocol (BGP), which is a protocol for routing data over the Internet. The BGP may include a table of IP networks or other identifying information which designate network reachability using an autonomous system. An autonomous system may be a collection of IP networks and routers under the control of one or more entities that present a common routing policy to the Internet.

Processing device 20, access element 22, and routing element 24 may include any suitable elements, hardware, software, objects, or components capable of effectuating their operations or additional operations where appropriate. Additionally, any one or more of the elements included in processing device 20 may be provided in an external structure or combined into a single module or device where appropriate.

Communication network 50 represents communication equipment, including hardware and any appropriate controlling logic for interconnecting elements coupled to communication network 50. In general, communication network 50 may be any network capable of transmitting audio and/or video telecommunication signals, data, and/or messages, including signals, data, or messages transmitted through text chat, instant messaging, and e-mail. Accordingly, communication network 50 may include all or a portion of, a radio access network; a public switched telephone network (PSTN); a public or private data network; a local area network (LAN); a metropolitan area network (MAN); a wide area network (WAN); a local, regional, or global communication or computer network such as the Internet; a wireline or wireless network; an enterprise intranet; or any combination of the preceding. Additionally, communication network 50 may represent any hardware and/or software configured to communicate information in the form of packets, cells, frames, segments or other portions of data. To facilitate the described communication capabilities, communication network 50 may include routers, hubs, switches, gateways, call controllers, and or any other suitable components in any suitable form or arrangements. Although communication network 50 is illustrated as a single network, communication network 50 may include any number or configuration of networks. Moreover, system 100 may include any number or configuration of communication networks 50.

It should be understood that modifications, additions, or omissions may be made to system 100. Additionally, while the embodiment of system 100 illustrated in FIG. 1 includes particular components that are each configured to provide certain functionality, alternative embodiments may include any appropriate combination of components with the described functionality divided between the components in any suitable manner.

Figure 2A:
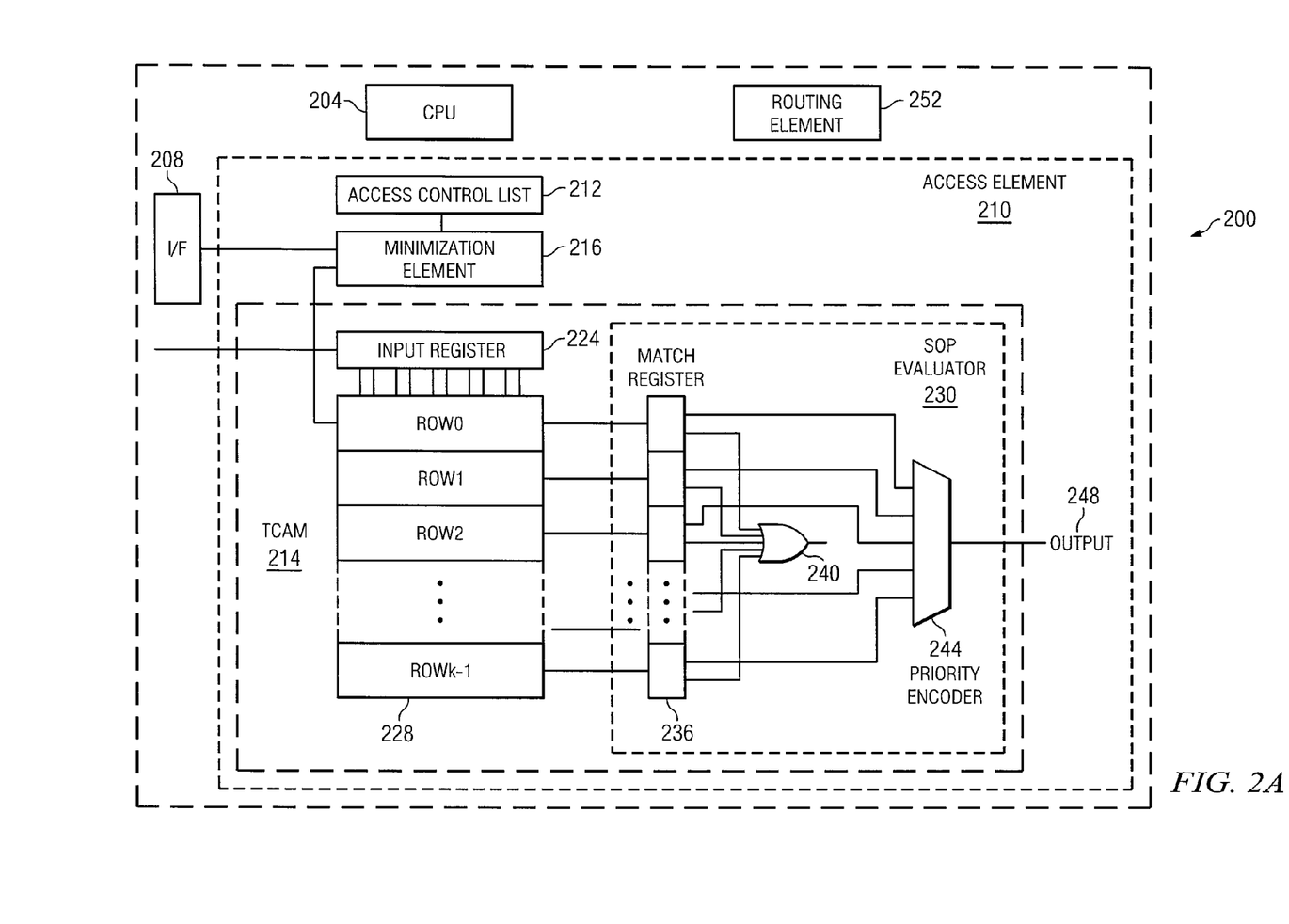
FIG. 2A is a block diagram illustrating a processing device with an access element comprising an SOP evaluator for determining if data has permission to be routed in accordance with a particular embodiment of the present disclosure.
Figure 2B:
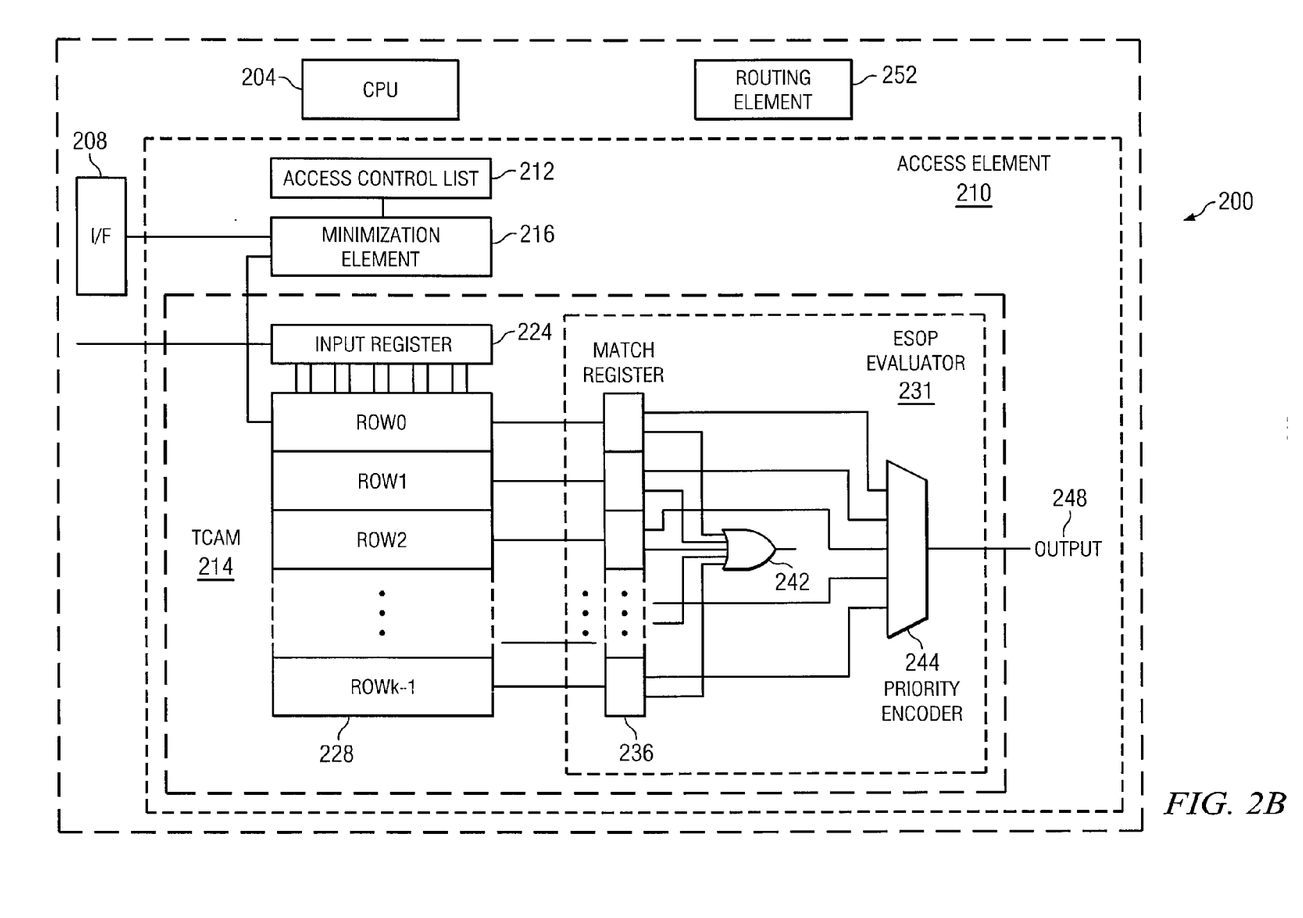
FIG. 2B is a block diagram illustrating a processing device with an access element comprising an ESOP evaluator for determining if data has permission to be routed in accordance with a particular embodiment of the present disclosure.
Figure 2C:
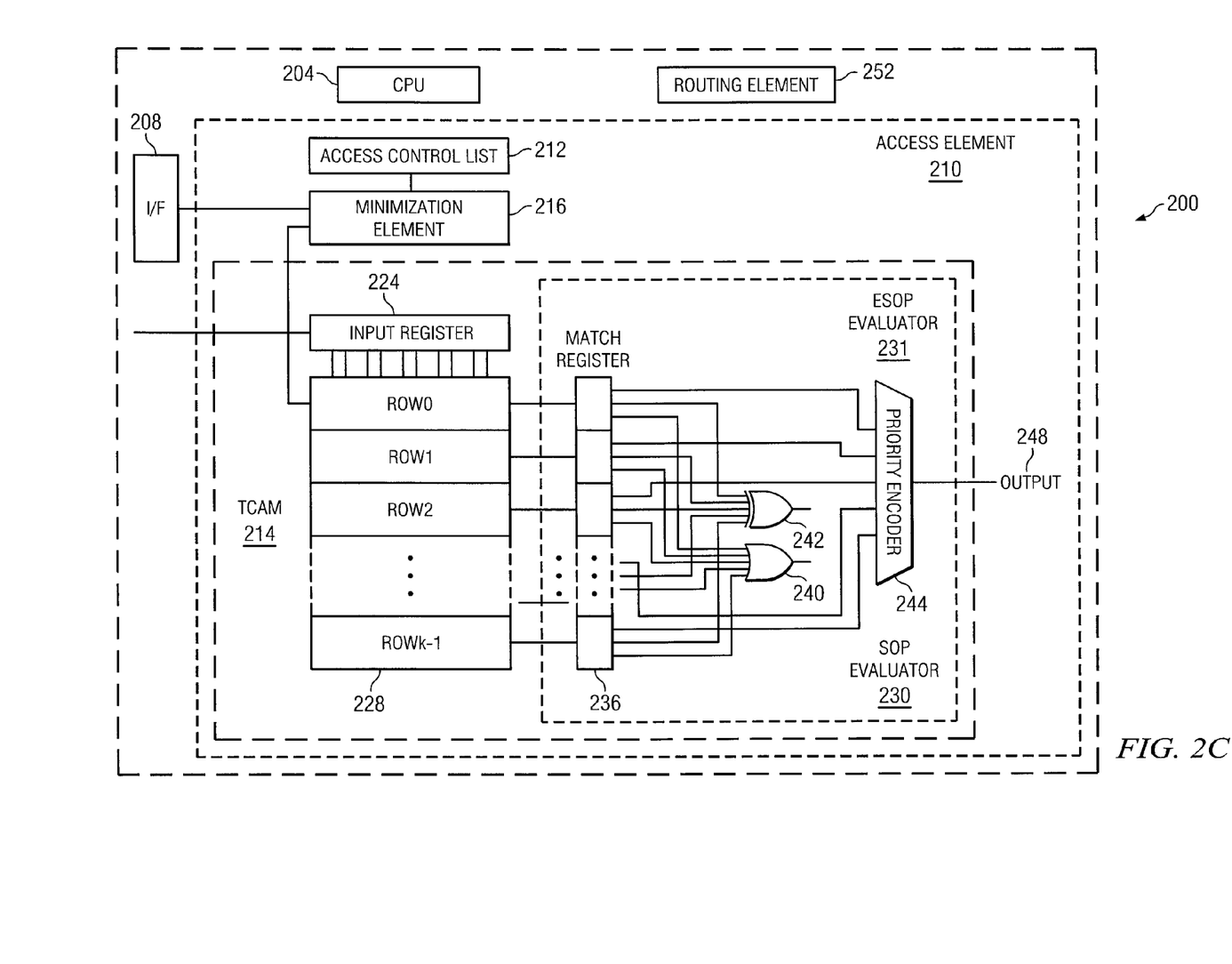
FIG. 2C is a block diagram illustrating a processing device with an access element comprising an SOP evaluator and an ESOP evaluator for determining if data has permission to be routed in accordance with a particular embodiment of the present disclosure.

FIGS. 2A, 2B, and 2C are block diagrams illustrating a processing device 200 with an access element 210 for determining if data has permission to be routed in accordance with particular embodiments of the present disclosure. According to the illustrated embodiments in FIGS. 2A, 2B, and 2C, processing device 200 may include a processor 204, an interface 208, an access element 210, and a routing element 252. Access element 210 may include an access control list 212, a TCAM 214, and a minimization element 216. In one embodiment illustrated as FIG. 2A, TCAM 214 may comprise an input register 224 and an SOP evaluator 230 for determining if data has permission to be routed in accordance with a particular embodiment. In one embodiment illustrated as FIG. 2B, TCAM 214 may comprise an input register 224 and an ESOP evaluator 231 for determining if data has permission to be routed in accordance with a particular embodiment. In one embodiment illustrated as FIG. 2C, TCAM 214 may comprise an input register 224, an SOP evaluator 230, and an ESOP evaluator 231 for determining if data has permission to be routed in accordance with a particular embodiment.

Processor 204 may be coupled to interface 208 and control the operation of processing device 200 and/or minimization element 216, and/or TCAM 214. In particular, processor 204 may execute commands and instructions. In particular embodiments, processor 204 may include application-specific integrated circuits (ASICs), field-programmable gate arrays (FGPAs), digital signal processors (DSPs), and/or any other suitable specific or general purpose processors.

Interface 208 may be any port or connection, real or virtual, including any suitable hardware and/or software that may allow processing device 200 to exchange information and signals. In particular embodiments, interface 208 may include a network interface card (NIC), Ethernet driver, universal serial bus (USB) drive, network card and/or firewall. Generally, interface 208 may receive and forward data.

Access control list 212 may be any data structure that includes rules that determine whether the data received from a source device should be forwarded to a destination device. For example, access control list 212 may include the source and destination IP address tuples that indicate the packets that are not allowed to be forwarded through the processing device 200 (e.g., a router). In one embodiment, access control list 212 may be represented by $L=\{<IP_s, IP_d>_i\}$. Typically, Internet Protocol (IP) addresses are thirty-two bit-long integers and, therefore, each tuple may be characterized by a sixty-four bit number. In one embodiment, IP addresses may be 128 bit-long integers for IPv6 and, therefore, each tuple may be characterized by a 256 bit number.

Minimization element 216 may include logic and/or one or more algorithms that minimize the size of access control list 212 for storage in TCAM 214. For example, minimization element 216 may convert access control list 212 to an ESOP expression comprising exclusive- or sum-of-product terms. Alternatively, minimization element 216 may convert access control list 212 to an SOP expression comprising sum-of-product terms. Typically, ESOP expressions may require less product terms than SOP expressions. Thus, the size of memory required to store access control list 212 in TCAM may be reduced by using ESOP expressions and evaluators rather than SOP expressions and evaluators. As a result, the TCAM 214 may be built with smaller dimensions using a smaller circuit, which may be more cost effective because the circuits may require less power and less hardware (e.g., fewer gates and memory cells). Additionally, a smaller circuit may also result in higher speeds. Typically, an access control list 212 may store more entries in a TCAM 214 using ESOP expressions and evaluators as opposed to using SOP expressions and evaluators.

In one embodiment, minimization element 216 constructs a minterm $m_i$ for each tuple i that comprises sixty-four variables. For example, tuple 1101111010101111001000000000011100100000000000-1101101111010101111 may be represented by minterm $x_1 x_2 \bar{x}_3 x_4 x_5 \ldots \bar{x}_{60} x_{61} x_{62} x_{63} x_{64}$. In one embodiment, minimization element 216 constructs a function $f$, where $f(x_1, \ldots, x_{64}) = \vee_{i=1}^{|L|} m_i$.

In one embodiment, minimization element 216 may build a binary decision diagram (BDD) or any other suitable decision diagram variation (e.g., a zero-suppressed BDD) for function $f$ and perform a depth-first search on the resulting directed acyclic graph to obtain an SOP expression for $f$ in the form of $f = \vee_{j=1}^{k} p_j$, where $j \leq |L|$. Each product term $p_j$ may depend on a subset of the sixty-four variables. In one embodiment, minimization element 216 may represent the product term in positional notation with three symbols (0, 1, X). For example, minimization element may represent the product term $x_1 \bar{x}_4 x_6$ in positional notation as 1XX0X1XXX . . . XX.

In one embodiment, minimization element 216 may build function $f$ as described above and determine an initial SOP expression through computation of a corresponding BDD. The product terms $p_j$ obtained by traversing a BDD may be nonoverlapping, which means that no variable assignment may evaluate more than one of the product terms $p_j$ to 1. Therefore, the obtained SOP expression may also be an ESOP expression.

In one embodiment, when presented with a source and destination IP address tuple T, access element 210 may decide whether to permit forwarding of the corresponding packet. In one embodiment, this decision may be made by evaluating function $f$ with variable assignments obtained from tuple T. For example, if tuple T is 10011, . . . , 10 in binary, access element 210 may calculate $f(1, 0, 0, 1, 1, \ldots, 1, 0)$.

In one embodiment as illustrated in FIG. 2A, minimization element 216 may apply one or more heuristic SOP minimization algorithms to minimize the SOP expression. In one embodiment as illustrated in FIG. 2B, minimization element 216 may apply one or more heuristic ESOP minimization algorithms to minimize the ESOP expression. In one embodiment as illustrated in FIG. 2C, minimization element 216 may apply one or more heuristic SOP minimization algorithms to minimize the SOP expression and one or more heuristic ESOP minimization algorithms to minimize the ESOP expression. Minimization element 216 may then select the expression with the least amount of product literals to store in the memory of TCAM 214. Typically, ESOP expressions may have fewer product literals than SOP expressions; if so, TCAM 214 may use the ESOP evaluator to process the ESOP expression. However, if an SOP expression has fewer product literals for a given function representing access control list 212, then TCAM 214 may use the SOP evaluator to process the SOP expression.

In one embodiment, minimization element 216 may support the partitioning of a BDD. Minimization element 216 may perform partitioning by multiplying with a set of "window" Boolean functions. For example, the window set may be $\{x_1, \bar{x}_1\}$ and the obtained partitions may be $x_1 f$ and $\bar{x}_1 f$. In one embodiment, minimization element 216 may independently translate the BDDs of the partitions to ESOP or SOP expressions and put these expressions into a single TCAM 214 or multiple, distinct TCAMs 214. In one embodiment, according to particular needs, one or more of these extensions may utilize one or more techniques or tools for processing partitioned ordered BDDs (POBDDs).

Input register 224 stores the bits of the data which will be compared to the access control list 212, which may be represented by an ESOP or SOP expression. In one embodiment, data may represent a packet and input register 224 may be a value of sixty-four bits comprising a thirty-two bit value associated with a source Internet Protocol address and a thirty-two bit value associated with a destination Internet Protocol address. The contents in input register 224 may be propagated to all rows 228 of TCAM 214 to determine which rows match the contents in input register 224.

For purposes of explanation only and not limitation, CAMs may provide a matching function with respect to all entries in the device. CAMs may provide a rapid comparison between a specific pattern of received data bits, commonly known as a search key or comparand, and data values stored in an associative CAM memory array to provide a match/no-match result. If there is a match for every bit in a group of stored bits in selected CAM memory cells, with every corresponding bit in the comparand, a match flag via a match line may indicate a match condition. In this way, the user may be notified that the data in the comparand was found in memory and a value corresponding to the match is returned. Thus, the result may be determined by finding a matching value (content), not from providing the address of the value as done for a Random Access Memory (RAM). Generally, there are two types of CAM cells used in CAM arrays: binary CAM cells and ternary CAM or TCAM 214 cells.

Binary CAM cells may store either a match value or a no match value. When the value stored in the binary CAM cell matches a data bit from an applied comparand, then a match may be indicated. However, when the logic value stored in the binary CAM cell does not match the data bit from the applied comparand, then no match may be indicated.

TCAM cells 228 may store three values including a logic high value, a logic low value, and a "don't care" value (e.g., 1, 0, X). When storing logic high and logic low values, the TCAM cell operates like a binary CAM cell as described above. However, a TCAM cell 228 storing a "don't care" value may provide a match condition for any data bit value from a comparand applied to that TCAM cell 228. This "don't care" capability may allow TCAM arrays to indicate when a data value matches a selected group of TCAM cells in a row of the TCAM array. For example, TCAM may match input value 1101 by entry 1X0X, but not by entry 1XX0.

In one embodiment, access element 210 may examine the contents of one or more TCAMs 214 in parallel and in constant time. TCAM 214 may be characterized by its width W and its capacity C, which indicate the number of rows of the TCAM. TCAM 214 may compare each of the bits stored in the rows of the TCAM 214 with each of the bits stored in the input register and set a bit for each entry when a match occurs.

The first layer of AND logic gates receive inputs from the TCAM indicating if bits in an entry indicated a match or not match. If all bits from input register 224 match all bits in an entry level, then the row of TCAM 232 associated with the matching entry may output a match signal to match register 236. Each TCAM row may be a 0, 1, or X. These values may be represented in bits as 00, 01, or 11 respectively. In one embodiment, each TCAM row may be four bits long as illustrated in the table below:

|  | $X_3$ | $X_2$ | $X_1$ | $X_0$ |  |
|---|---|---|---|---|---|
|  | 1 | 0 | 0 | 1 |  |
| $Yi_{3i}$ | ------------- | | | | $Yi_{00}$ |
|  | ------------- | | | | |
| → | 01 | 11 | 00 | 11 | ← |
|  | 1 | X | 0 | X |  |

In one embodiment, matching output may be implemented by the following algorithms:

$$Zij = Yyi + \overline{Yij_0} \oplus Xj$$

$$Zij = Yij_1 + \overline{Yij_0} \oplus Xi$$

In one embodiment, row output $i = \hat{j} Zij$.

Match register 236 may store bits of size C where each bit corresponds to the result of the matching input from input register 224 with an entry in the memory of TCAM.

In one embodiment illustrated by the SOP evaluator in FIG. 2A, all of the bits from match register 236 are OR'ed 240 together, resulting in a single bit output O. Output O may be 1 when tuple T is presented at input register 224 of the TCAM and function $f$ evaluates to 1.

In one embodiment illustrated by the ESOP evaluator in FIG. 2B, all of the bits from match register 236 are XOR'ed 242 together, resulting in a single bit output X. Output X may be 1 when tuple T is presented at input register 224 of the TCAM and function $f$ evaluates to 1.

In one embodiment illustrated by the SOP and ESOP evaluators in FIG. 2C, all of the bits from match register 236 are calculated in parallel with the OR 240 and XOR gates 242, resulting in a single bit output X and a single bit output Y. In one embodiment as illustrated by FIG. 2C, access element 210 may select between an SOP expression and evaluator or an ESOP expression and evaluator for representing the access control list 212 based on the expression with the least number of product terms. If the SOP expression is put into TCAM 214, access element may examine output O instead of output X. If the ESOP expression is put into TCAM 214, access element may examine output X instead of output O.

Priority encoder 244 may output the address of TCAM row 228 associated with the first match bit stored in the match register 236. In one embodiment, priority encoder 244 may receive inputs from the outputs of match register 236. In one embodiment, access element 210 and/or routing element 252 may determine a port to forward the data (e.g., a packet) based on the address associated with the selected row of access control list 212 stored in TCAM 214.

Typically, CAMs and TCAMs 214 behave as natural SOP evaluators that include a first layer of AND logic gates 232 and a second layer of one or more OR logic gates 240 as illustrated in FIG. 2A. CAMs and/or TCAMs may need to be modified to behave as an ESOP evaluators that include a first layer of AND logic gates 232 and a second layer of one or more XOR logic gates 242 as illustrated in FIG. 2B. By modifying the CAMs and/or TCAMS to behave as ESOP evaluators to process ESOP expressions, access control list 212 can be stored more efficiently in processing device 200. By reducing the number of entries representing access control list 212 in the TCAM, processing device 200 gains numerous advantages as discussed throughout this disclosure. In one embodiment as illustrated by FIG. 2B, CAMs and/or TCAMS can be modified to behave as an ESOP evaluators by replacing the OR gate 240 with an XOR gate 242. In one embodiment as illustrated by FIG. 2C, CAMS and/or TCAMS can be modified to behave as an ESOP evaluator by placing the XOR gate 242 next to the OR gate 240.

The algorithms described in FIGS. 2A, 2B, and 2C are only example embodiments. One or more elements may execute one or more portions of the algorithm or algorithms described above, according to particular needs. One or more elements in FIGS. 2A, 2B, and 2C may include a hardware, software, or embedded logic component or a combination of two or more such components for executing one or more portions of the algorithms described above, according to particular needs.

Figure 3:
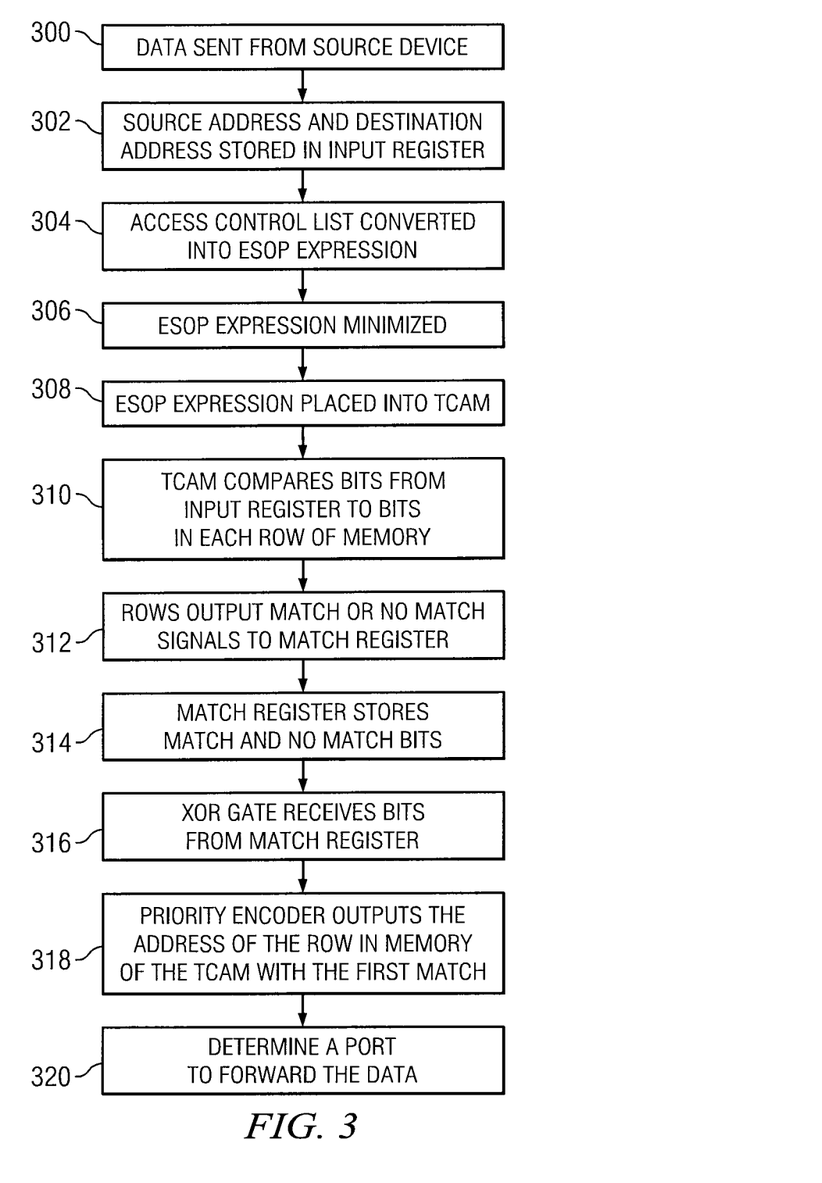
FIG. 3 is a flowchart illustrating a method for determining if data has permission to be routed by a processing device with an access element comprising an ESOP evaluator in accordance with a particular embodiment of the present disclosure.

FIG. 3 is a flowchart illustrating a method for determining if data has permission to be routed by a processing device with an access element comprising an ESOP evaluator in accordance with a particular embodiment of the present disclosure. The illustrated method may be performed by one or more components of a processing device as discussed with respect to FIG. 2B. Additionally, certain steps of the illustrated method may be implemented using logic or code embodied on a computer embodied in a computer readable medium.

The illustrated method begins at step 300 where data sent from source device that is destined for destination device is received by the processing device. At step 302, the processing device stores the source address and the destination address of the received data into an input register. At step 304, a minimization element converts an access control list into an ESOP expression comprising product terms. At step 306, the minimization element applies one or more heuristic ESOP minimization algorithms to minimize the number of product terms of the ESOP expression. At step 308, access element stores the ESOP expression into rows of a TCAM. Each product term of the ESOP expression is stored in a row of the TCAM.

At step 310, the TCAM compares the bits from the input register to the bits of each row of the TCAM. At step 312, a first layer of AND logic gates receive inputs from the TCAM indicating if bits in an entry indicated a match or not match. If all bits from the input register match all bits in an entry level, then the row of the TCAM associated with the matching entry may output a match signal to a match register. At step 314, the match register stores bits of the match outputs and no match signals received by the first layer of AND gates 232. At step 316, an XOR logic gate 242 receives the match and no match outputs from match register 236 and outputs a signal indicating if the value in input register 224 match an entry in TCAM. At step 318, priority encoder 244 may output the address of the TCAM row 228 associated with the first match bit stored in the match register 236. At step 320, processing device 200 may determine a port to forward the data based on the address associated with the selected row of access control list stored in TCAM.

One skilled in the art will readily recognize that some of the steps illustrated in FIG. 3 may be combined, modified or deleted where appropriate, and additional steps may also be added to the flowchart. It should also be understood that steps may be performed in any suitable order without departing from the intended scope of the invention.

Modifications, additions, or omissions may be made to embodiments and components of the system without departing from its intended scope. As one example, the method and means for extracting the user settings of a computer in a first domain and applying the user settings to a computer in a second domain may be modified. Additionally, while certain embodiments and components of system have been described in detail, numerous changes, substitutions, variations, alterations and modifications may be ascertained by those skilled in the art. It is intended that the present disclosure encompass all such changes, substitutions, variations, alterations and modifications as falling within the spirit and scope of the appended claims.

What is claimed is:

1. A method, comprising:
   receiving input data comprising a plurality of bits;
   processing an access control list into an exclusive-or sum-of-products (ESOP) expression comprising a plurality of product terms;
   storing a plurality of bits associated with the plurality of product terms in a ternary content addressable memory (TCAM) comprising a plurality of rows;
   comparing the plurality of bits associated with the input data to the plurality of bits associated with the product terms stored in each row of the plurality of rows, wherein each row of the TCAM outputs a plurality of signals, wherein each of the plurality of signals indicate a match or no match for each bit stored in the selected row;
   receiving the plurality of signals from the plurality of rows by an ESOP evaluator;
   outputting, by the ESOP evaluator, an address associated with a selected row from the plurality of rows of the TCAM, the selected row storing a plurality of bits that match the plurality of bits associated with the input data; and
   receiving a packet comprising the input data and determining a port to forward the packet based on the address associated with the selected row.

2. The method of claim 1, the ESOP evaluator comprising:
   a plurality of AND logic gates, wherein each of the plurality of AND logic gates receive the plurality of signals from an associated row of the plurality of rows of the TCAM and outputs a signal indicating if all of the bits matched or not;
   a match register, wherein each register stores a plurality of bits associated with the outputs from the plurality of the AND logic gates;
   an XOR logic gate, wherein the XOR logic gate receives the plurality of bits from the match register and outputs a signal indicating if at least one row of the TCAM matches the plurality of bits associated with the input data; and
   a priority encoder, wherein the priority encoder outputs the address associated with a selected row from the plurality of rows of the TCAM, the selected row storing a plurality of bits that match the plurality of bits associated with the input data.

3. The method of claim 1, wherein the CAM requires less rows if an ESOP evaluator is used rather than a sum-of-products (SOP) evaluator, wherein the SOP evaluator comprises a plurality of AND logic gates and an OR logic gate.

4. The method of claim 1, wherein the access control list comprises a plurality of 256 bit values comprising a 128 bit value associated with a source IPv6 address and a 128 bit value associated with a destination IPv6 address.

5. The method of claim 1, wherein the plurality of product terms are stored in a plurality of CAMs.

6. The method of claim 1, wherein the processing the access control list into an ESOP expression comprises applying a minimization algorithm to reduce the size of the ESOP expression.

7. The method of claim 1, wherein the processing the access control list into an ESOP expression comprises:
   creating a binary decision diagram; and
   performing a depth first search on the binary decision diagram before minimization of the ESOP expression.

8. The method of claim 1, wherein the access control list comprises a plurality of sixty-four bit values comprising a thirty-two bit value associated with a source Internet Protocol address and a thirty-two bit value associated with a destination Internet Protocol address.

9. An apparatus, comprising:
   a minimization element operable to:
      process an access control list into an exclusive-or sum-of-products (ESOP) expression comprising a plurality of product terms; and
   an access element operable to:
      receive input data comprising a plurality of bits;
      store a plurality of bits associated with the plurality of product terms in a ternary content addressable memory (TCAM) comprising a plurality of rows;
      compare the plurality of bits associated with the input data to the plurality of bits associated with the product terms stored in each row of the plurality of rows, wherein each row of the TCAM outputs a plurality of signals, wherein each of the plurality of signals indicate a match or no match for each bit stored in the selected row;
      receive the plurality of signals from the plurality of rows by an ESOP evaluator;
      output, by the ESOP evaluator, an address associated with a selected row from the plurality of rows of the TCAM, the selected row storing a plurality of bits that match the plurality of bits associated with the input data; and
      receive a packet comprising the input data and determining a port to forward the packet based on the address associated with the selected row.

10. The apparatus of claim 9, the ESOP evaluator comprising:
- a plurality of AND logic gates, wherein each of the plurality of AND logic gates receive the plurality of signals from an associated row of the plurality of rows of the TCAM and outputs a signal indicating if all of the bits matched or not;
- a match register, wherein each register stores a plurality of bits associated with the outputs from the plurality of the AND logic gates;
- an XOR logic gate, wherein the XOR logic gate receives the plurality of bits from the match register and outputs a signal indicating if at least one row of the TCAM matches the plurality of bits associated with the input data; and
- a priority encoder, wherein the priority encoder outputs the address associated with a selected row from the plurality of rows of the TCAM, the selected row storing a plurality of bits that match the plurality of bits associated with the input data.

11. The apparatus of claim 9, wherein the CAM requires less rows if an ESOP evaluator is used rather than a sum-of-products (SOP) evaluator, wherein the SOP evaluator comprises a plurality of AND logic gates and an OR logic gate.

12. The apparatus of claim 9, wherein the access control list comprises a plurality of 256 bit values comprising a 128 bit value associated with a source IPv6 address and a 128 bit value associated with a destination IPv6 address.

13. The apparatus of claim 9, wherein the plurality of product terms are stored in a plurality of CAMs.

14. The apparatus of claim 9, wherein the processing the access control list into an ESOP expression comprises applying a minimization algorithm to reduce the size of the ESOP expression.

15. The apparatus of claim 9, wherein the processing the access control list into an ESOP expression comprises:
- creating a binary decision diagram; and
- performing a depth first search on the binary decision diagram before minimization of the ESOP expression.

16. The apparatus of claim 9, wherein the access control list comprises a plurality of sixty-four bit values comprising a thirty-two bit value associated with a source Internet Protocol address and a thirty-two bit value associated with a destination Internet Protocol address.

17. A system, comprising:
- means for receiving input data comprising a plurality of bits;
- means for processing an access control list into an exclusive-or sum-of-products (ESOP) expression comprising a plurality of product terms;
- means for storing a plurality of bits associated with the plurality of product terms in a ternary content addressable memory (TCAM) comprising a plurality of rows;
- means for comparing the plurality of bits associated with the input data to the plurality of bits associated with the product terms stored in each row of the plurality of rows, wherein each row of the TCAM outputs a plurality of signals, wherein each of the plurality of signals indicate a match or no match for each bit stored in the selected row;
- means for receiving the plurality of signals from the plurality of rows by an ESOP evaluator;
- means for outputting, by the ESOP evaluator, an address associated with a selected row from the plurality of rows of the TCAM, the selected row storing a plurality of bits that match the plurality of bits associated with the input data;
- means for receiving a packet comprising the input data; and
- means for determining a port to forward the packet based on the address associated with the selected row.

* * * * *